(12) United States Patent
Miller et al.

(10) Patent No.: US 11,461,498 B2
(45) Date of Patent: Oct. 4, 2022

(54) SYSTEMS AND METHODS FOR SECURED, MANAGED, MULTI-PARTY INTERCHANGES WITH A SOFTWARE APPLICATION OPERATING ON A CLIENT DEVICE

(71) Applicant: mSIGNIA, Inc., Laguna Beach, CA (US)

(72) Inventors: Paul T. Miller, Laguna Beach, CA (US); George A. Tuvell, Arlington, TN (US)

(73) Assignee: mSignia, Inc., Laguna Beach, CA (US)

( * ) Notice: Subject to any disclaimer, the term of this patent is extended or adjusted under 35 U.S.C. 154(b) by 107 days.

(21) Appl. No.: 16/783,020

(22) Filed: Feb. 5, 2020

(65) Prior Publication Data
US 2020/0250342 A1 Aug. 6, 2020

Related U.S. Application Data

(60) Provisional application No. 62/918,619, filed on Feb. 6, 2019.

(51) Int. Cl.
| | |
|---|---|
| *G06F 21/62* | (2013.01) |
| *H04L 9/40* | (2022.01) |
| *H04L 67/53* | (2022.01) |
| *G16Y 30/10* | (2020.01) |

(52) U.S. Cl.
CPC ...... *G06F 21/6263* (2013.01); *H04L 63/1433* (2013.01); *H04L 67/53* (2022.05); *G16Y 30/10* (2020.01)

(58) Field of Classification Search
CPC .............. G06F 21/6263; G06F 21/554; H04L 63/1433; H04L 67/20; H04L 67/10
See application file for complete search history.

(56) References Cited

U.S. PATENT DOCUMENTS

| | | | |
|---|---|---|---|
| 9,910,655 B1 * | 3/2018 | Ranganathan | G06F 8/61 |
| 2011/0154439 A1 * | 6/2011 | Patel | G06F 21/554 |
| | | | 717/124 |
| 2012/0210119 A1 * | 8/2012 | Baxter | G06F 16/95 |
| | | | 713/150 |

(Continued)

FOREIGN PATENT DOCUMENTS

| | | | | |
|---|---|---|---|---|
| CN | 104488277 A | * | 4/2015 | G06F 16/245 |
| CN | 107122200 A | * | 9/2017 | |

OTHER PUBLICATIONS

Developing Software for Multi-Access Edge Computing, ETSI White Paper No. 20 (Year: 2019).*

*Primary Examiner* — Shanto Abedin
(74) *Attorney, Agent, or Firm* — Scott R. Hansen; Viking IP Law

(57) ABSTRACT

A system and methods which manage and secure the interaction between (1) the owner of a client application and third-parties, and (2) between the third-parties and the client application while the client application is operating on a user's client computer. The invention enables interactive primitives such as ensuring the integrity of the client environment, reading data from the client, writing data to the client, collecting data from the user, and ensuring privacy. All functionality is done through the client application and under management and control of the owner of the client application.

5 Claims, 10 Drawing Sheets

(56) References Cited

U.S. PATENT DOCUMENTS

| | | | |
|---|---|---|---|
| 2013/0347094 A1* | 12/2013 | Bettini | G06F 21/577 |
| | | | 726/11 |
| 2014/0317114 A1* | 10/2014 | Alla | H04N 21/25883 |
| | | | 707/769 |
| 2015/0312233 A1* | 10/2015 | Graham, III | H04L 63/08 |
| | | | 713/171 |
| 2015/0381580 A1* | 12/2015 | Graham, III | H04L 63/0428 |
| | | | 713/168 |
| 2019/0018719 A1* | 1/2019 | Brin | H04L 67/40 |
| 2020/0160270 A1* | 5/2020 | Bodin | G06Q 50/01 |

* cited by examiner

FIG. 1 SDK Manager Overview
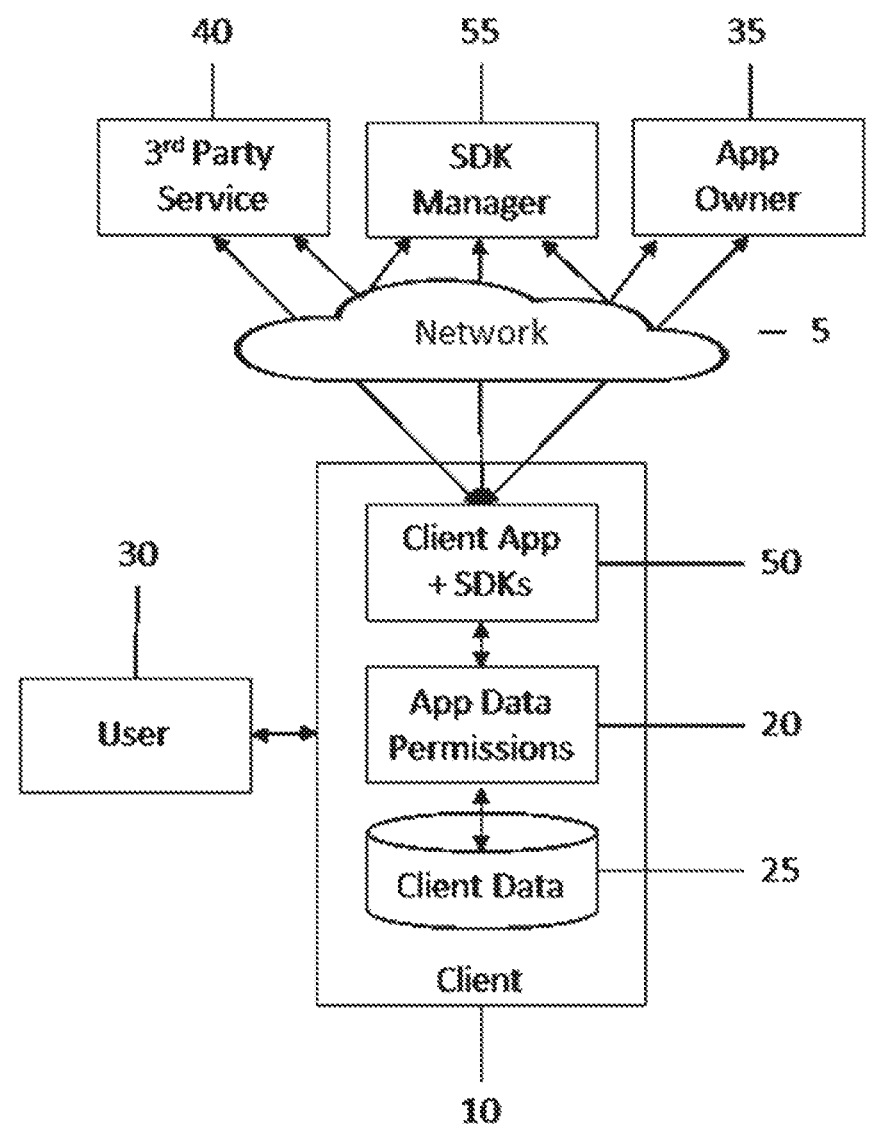

FIG. 2 SDK Registration
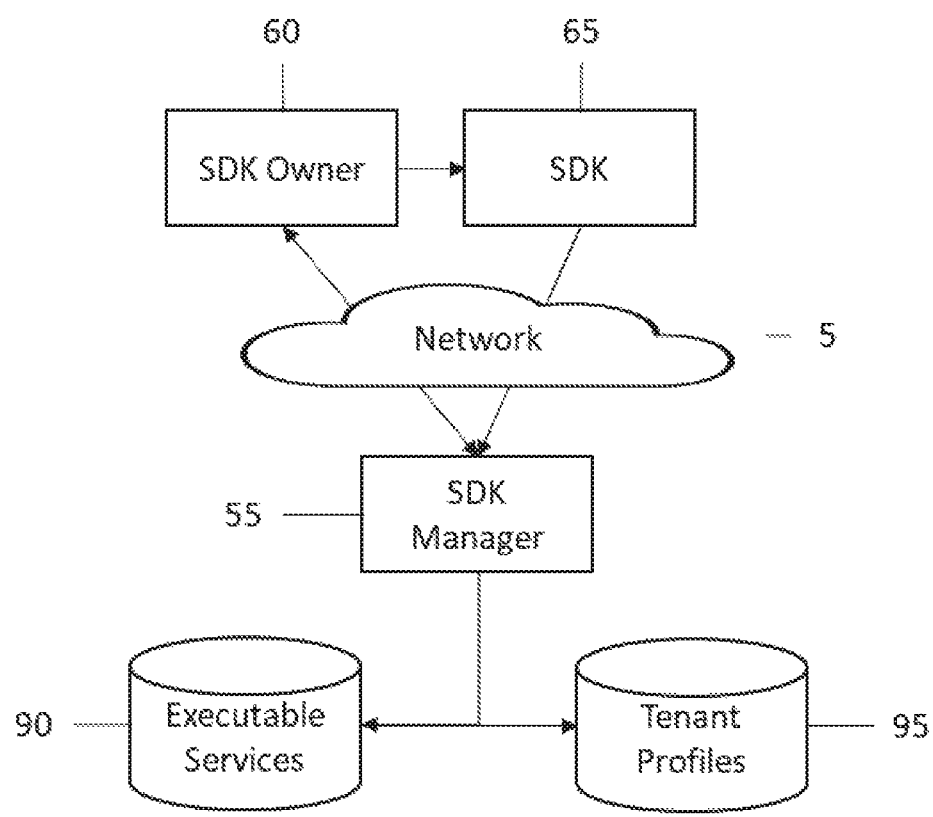

Fig. 3 App Registration
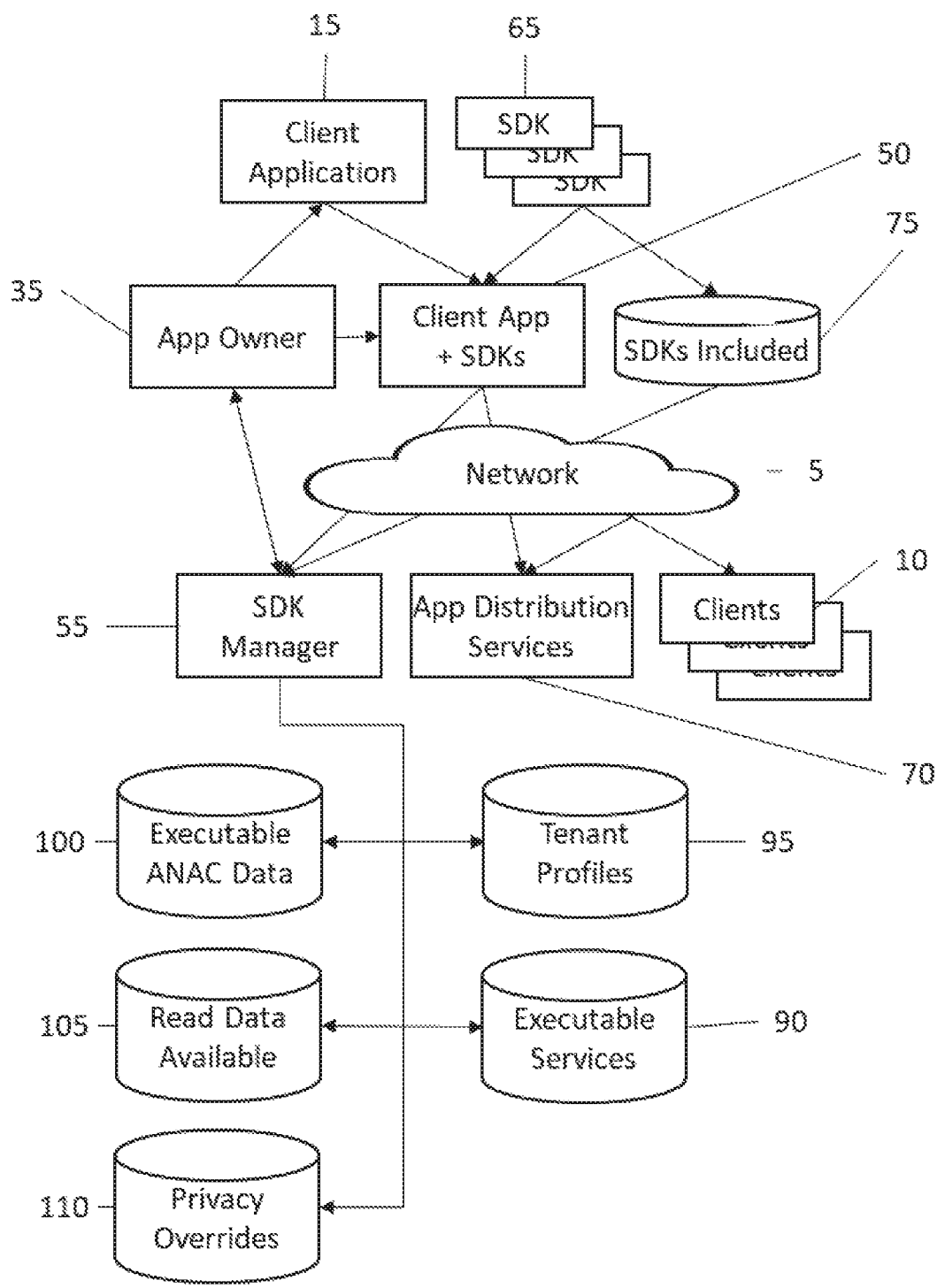

FIG. 4   3rd Party Registration
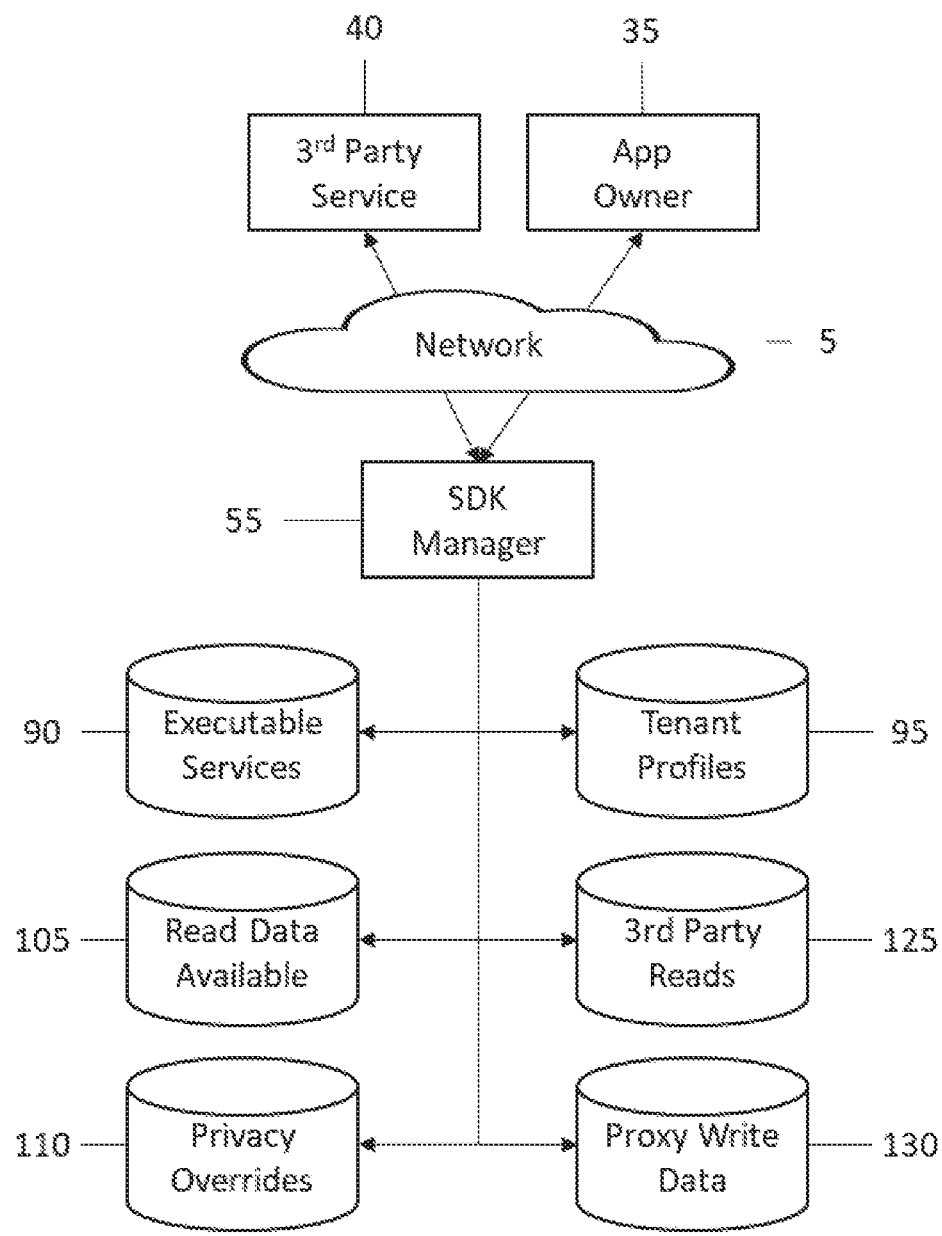

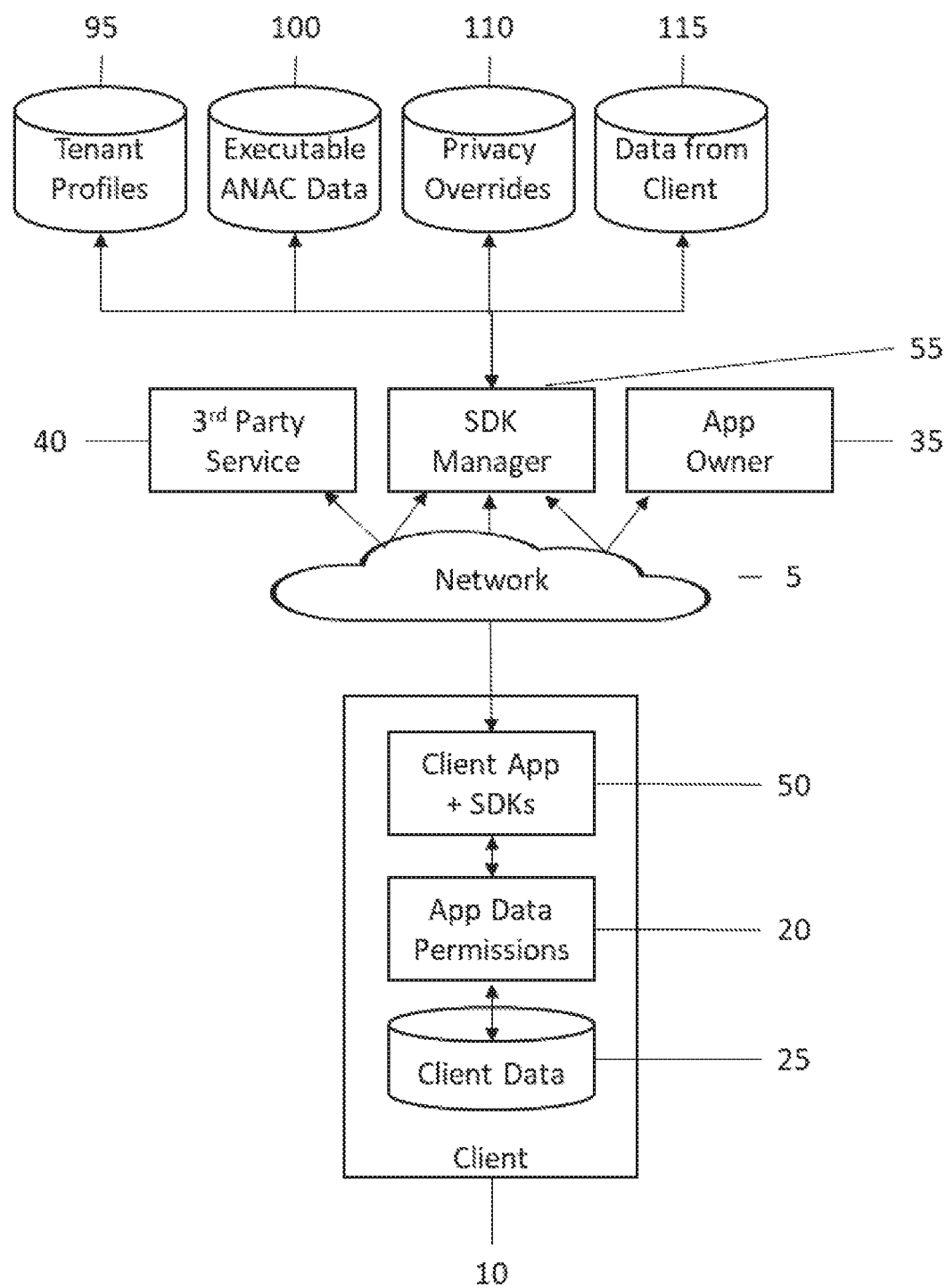
FIG. 5 App Network Access Control (ANAC)

FIG. 6  3rd Party Initiated App Connection
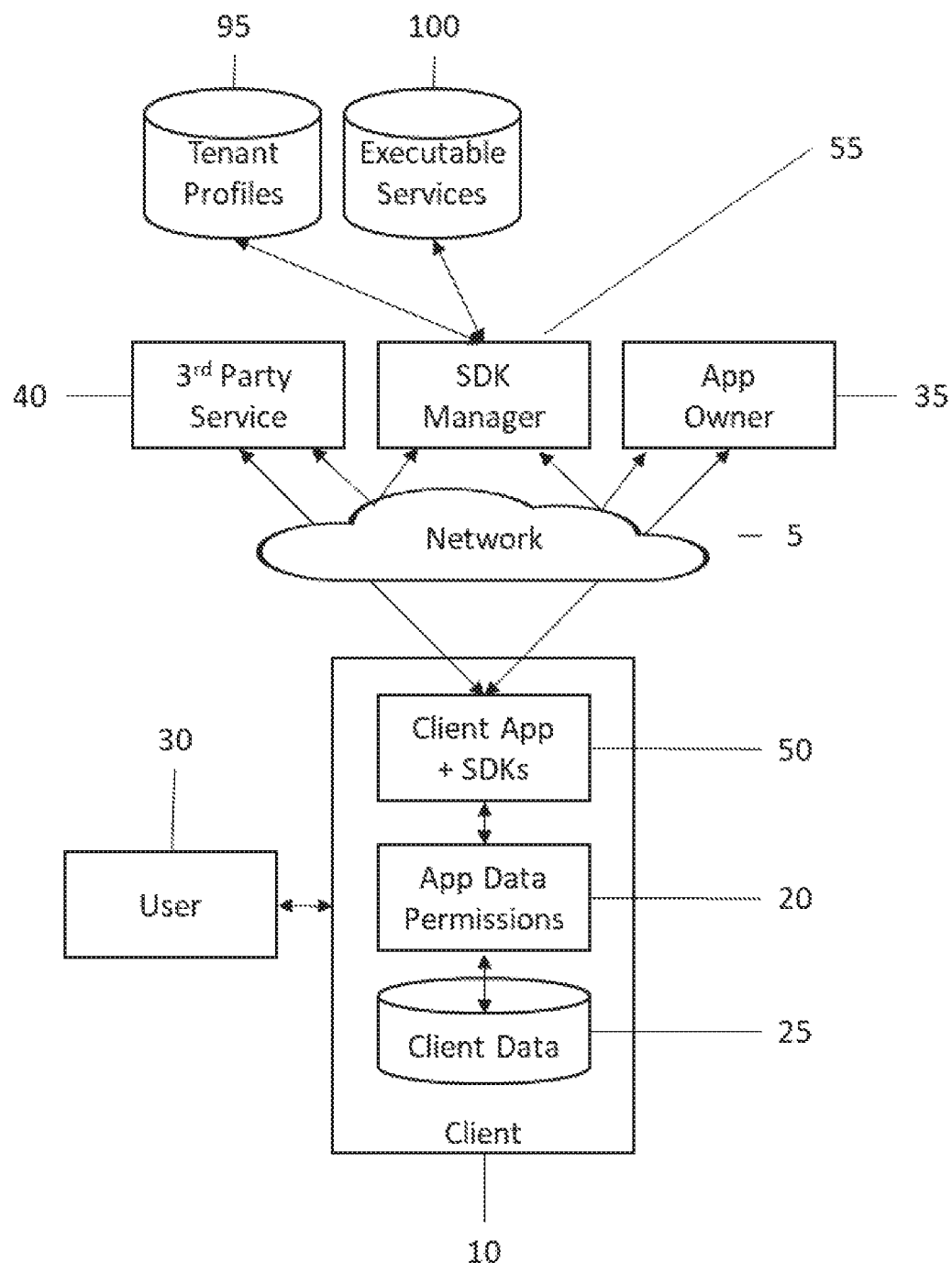

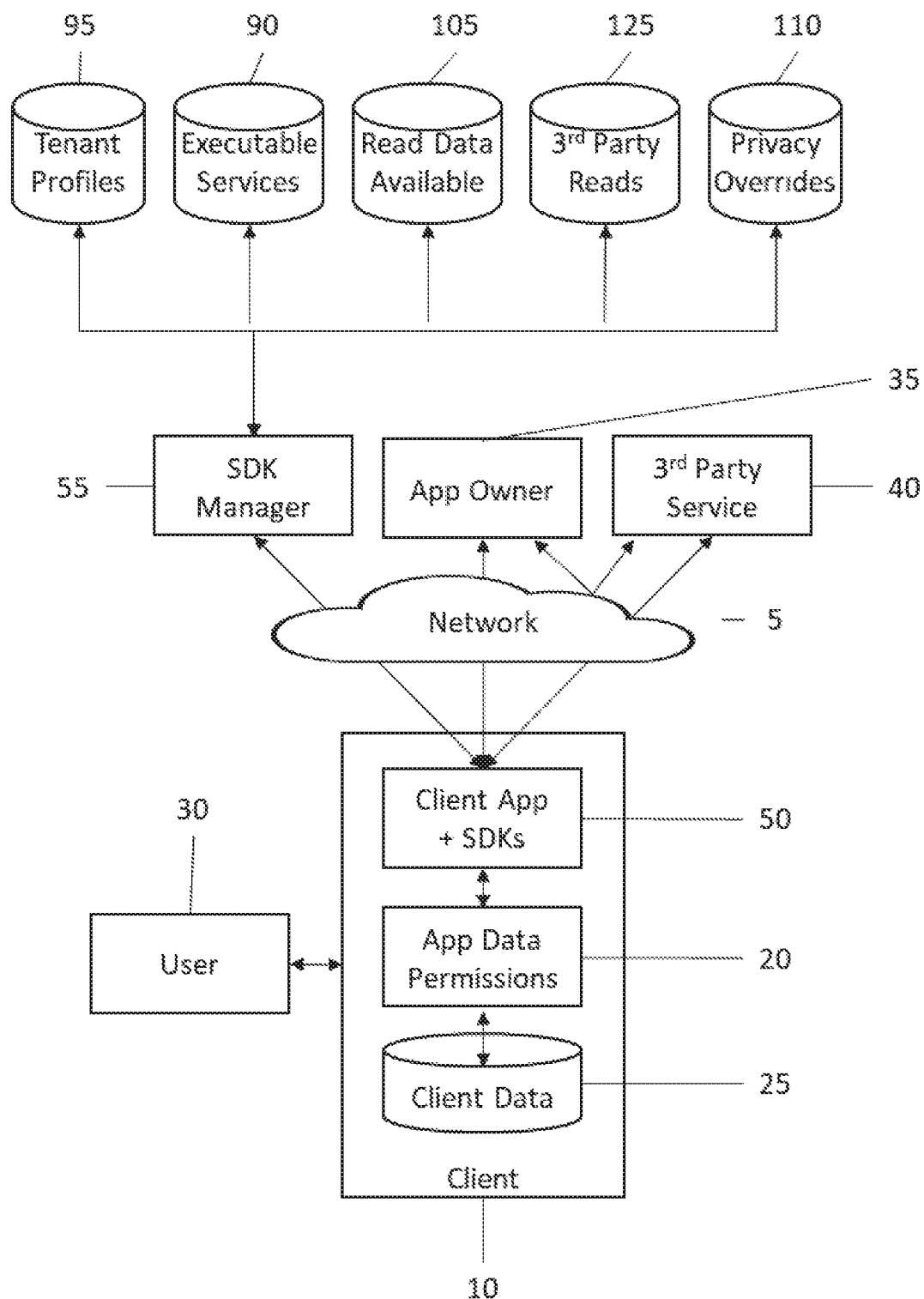
FIG. 7  3rd Party Read Data

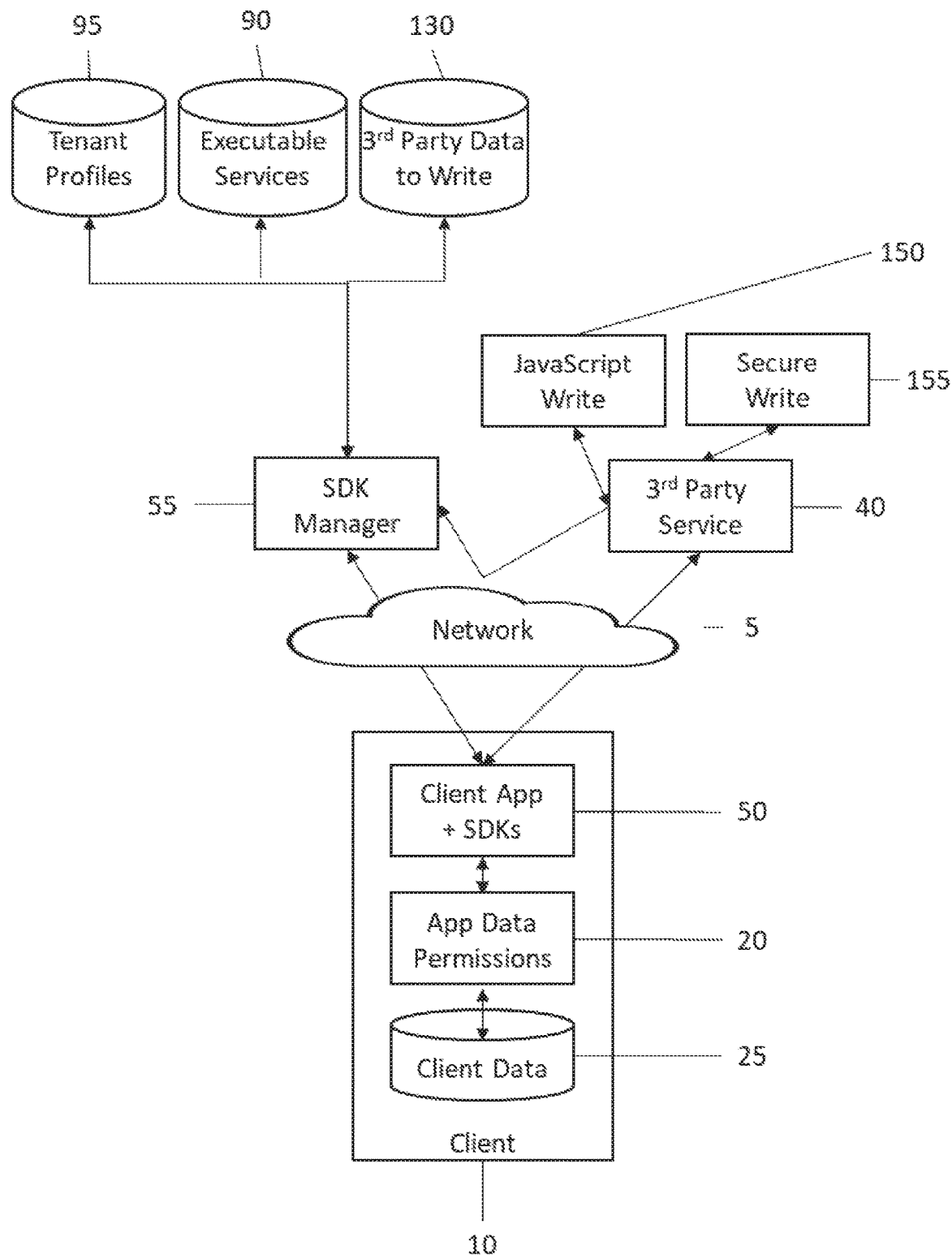
FIG. 8  3rd Party Provision Data

FIG. 9   SDK Manager Data
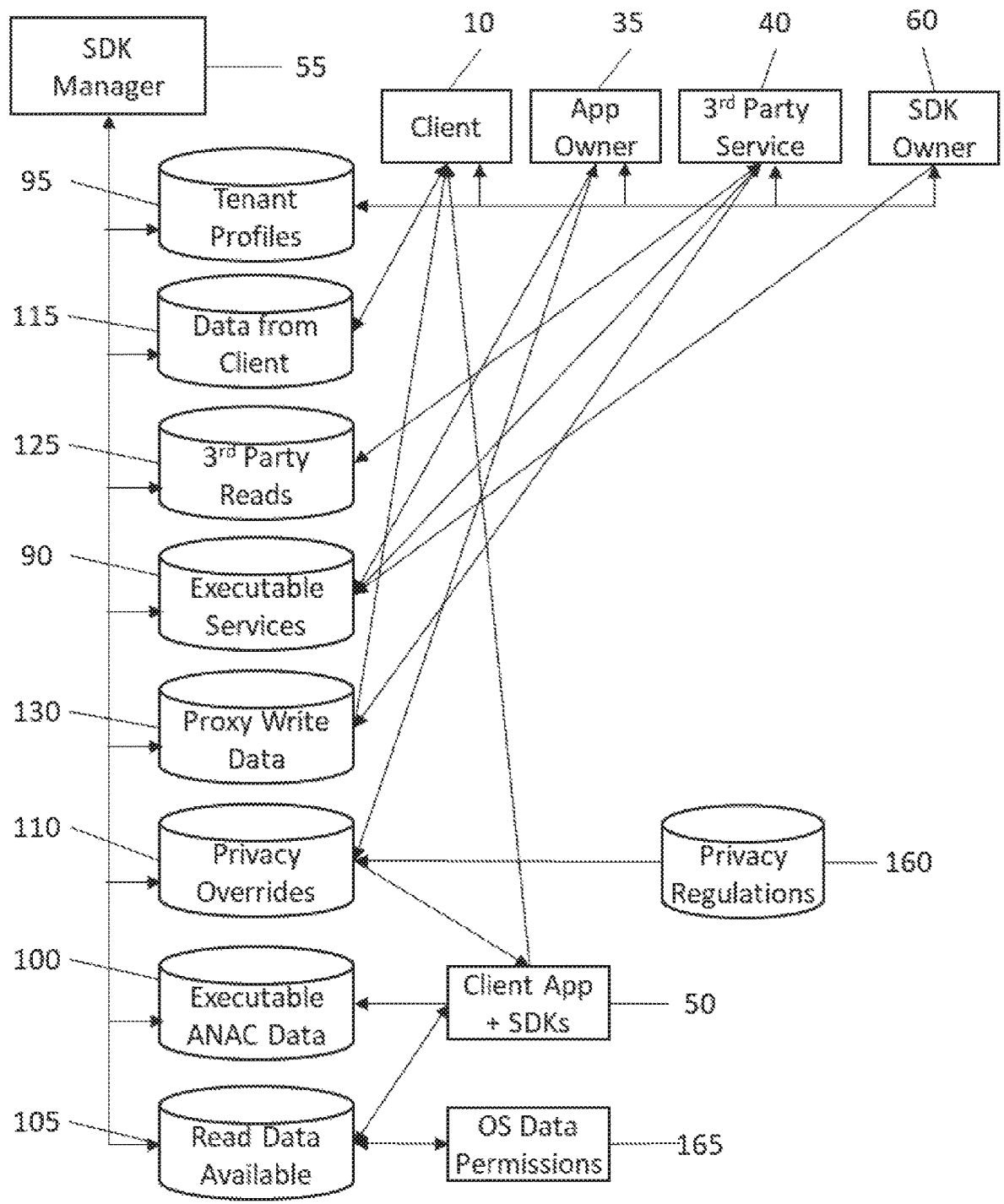

FIG. 10  SDK Manager Hierarchy
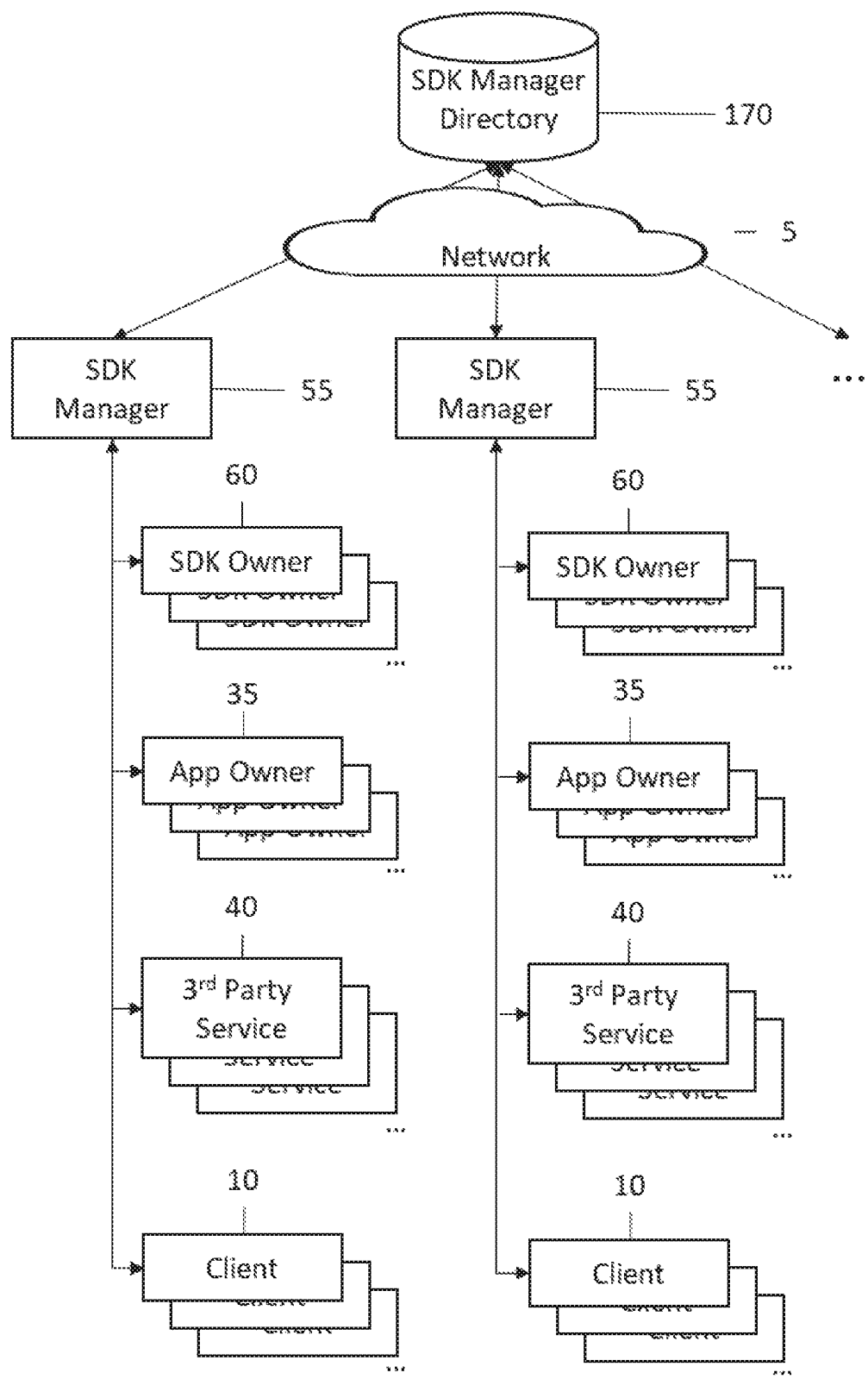

SYSTEMS AND METHODS FOR SECURED, MANAGED, MULTI-PARTY INTERCHANGES WITH A SOFTWARE APPLICATION OPERATING ON A CLIENT DEVICE

CROSS-REFERENCE TO RELATED APPLICATIONS

This application claims priority to and the benefit of U.S. Provisional Patent Application No. 62/918,619, filed on Feb. 6, 2019, which is herein incorporated by reference in its entirety.

BACKGROUND

The present invention is in the technical field of computers. More particularly, the present invention is in the technical field of the connected ecosystem of computers using a network to access remote services. This connected ecosystem has increased in complexity due to client application ownership, demands for increased access to data, and improved security. These demands complicate connected services and the user experience.

RELATED ART

Prior patents and inventions, such as connected access via a browser, have enabled multi-party interchanges in an unmanaged, ad hoc, and insecure manner. Existing art and product, such as signed mobile applications and integrated developer environments, improved security and operational management, but they failed to enable multi-party interchanges necessary to deliver complex, connected services.

However, these inventions and others assume a well-managed, secure, multi-party interchange capability that scales to the size and performance capabilities required for software application ecosystem especially as it expands beyond mobile and into the scale and variety of client computers which encompass the Internet of Things.

SUMMARY

A system and methods which manage and secure the interaction between (1) the owner of a client application and third-parties, and (2) between the third-parties and the client application while the client application is operating on a user's client computer. The invention enables interactive primitives such as ensuring the integrity of the client environment, reading data from the client, writing data to the client, collecting data from the user, and ensuring privacy. All functionality is done through the client application and under management and control of the owner of the client application.

The invention uses a hierarchy of SDK managers which catalogue, manage and exchange data on (1) entities including SDK providers, client app owners, third-party services, and client computers; (2) software capabilities available through SDKs and client applications; (3) system capabilities including functions available through the client operating systems and client hardware; (4) regulations for privacy and other matters that may override how data is processed; (5) data exchanged using the SDK manager as a proxy rather than directly exchanging data between the client computer and a third-party service; and (6) certain security-related data collected from the client computer that can be useful in risk-scoring or the training of learning systems.

Historically, a user engaged online services by using their PC and a browser to access websites. The browser was a single executable that could access nearly any web service. Browsing evolved to allow multiple web services to dynamically download code to the client computer; however, these methods were unmanaged, yielding chaotic and risky results.

Mobile devices, running operating systems like iOS and Android, defined a connected experience that was better managed and more secure. Operating systems digitally signed mobile apps and permissions were created to manage and control the data an application could access.

The fundamental connection differences between browser and client app connection environments create inequities that represent challenges, especially in multi-party interchanges; including: (1) Client integrity verification, (2) Downloadable code, (3) SDK selection, (4) Server initiated connections, (5) Controlled access to rich data, and (6) Privacy.

The inefficiencies and limitations enumerated above become even more disorderly as additional, special-purpose devices which make up the Internet of Things (IoT) are deployed. Early instances of IoT devices including, but not limited to, home hubs, smart cars, smart homes, and wearables, extend the device ecosystem and invite participation from additional parties. Adding parties, devices and systems multiplies the problems described below.

Client Integrity Verification

PCs and browsers often undergo a Network Access Control (or NAC) security screening before the browser is allowed to connect to the web service. This was—in part—in response to the inadvertent enabling of malicious code downloaded and executed within a browser connection. Downloaded code sometimes resulted in identity theft and loss of privacy.

With mobile operating systems, mobile applications are signed and validated before the application is allowed to execute. This reduces the amount of malicious code permitted to run on a client computer. Such improvements have made NAC nearly non-existent with mobile app connections, yet risks still exist from risky network connections, rogue apps designed to masquerade as legitimate client applications, compromised operating systems, emulators and bots.

The invention enables a multi-party interchange ecosystem which provides Application Network Access Control (or ANAC) to ensure the integrity of the device connecting to web services and detect risks (like those detailed above) so that data collected from the client can be trusted.

Downloadable Code

Downloadable code in browser connections allows various parties to differentiate their service by running customized commands on the user's device as part of a single connection experience. However, the functionality of the downloadable code was unmanaged and vague. Users and legitimate web services were left wondering what third-party JavaScript, plug-in, iFrames, or other code method was being downloaded, what exactly the downloaded code was doing as it executed on the client computer, what data was being accessed on the client and where client and user data was being uploaded.

With uncontrolled third-party downloadable code, the owner of the initial website visited lost control of the user experience and risked brand reputation and even regulation penalties (e.g. GDPR and other privacy laws) when downloadable code ran afoul.

The invention enables a multi-party interchange ecosystem which provides a well-managed set of operational primitives which client app owners define and implement but which are managed and made available to third-parties so that they can call the primitives to execute functionality on the user's client device.

SDK Selection

While client applications are better monitored and more reliable, the apps are a compiled-code executable whose functionality cannot be dynamically altered. It is difficult for a developer to know at app compile time which third-party services will be required, especially when the selection of a third-party service can be influenced by user preference. This leads to either many SDKs being integrated into the client app—creating a size and complexity problem for the resultant executable—or to the exclusion of third-parties and their services because the required $3^{rd}$ party SDK is not included in the executable.

In some cases, this has prompted client applications to open a browser session; reverting to the unmanaged and insecure browser processes in an effort to dynamically download required functionality.

Extending on the set of operational primitives above, the invention enables a multi-party interchange ecosystem that can benefit from SDKs designed for general-purpose data functionality such as read, write, and get data from user. Additional security functions defined in the invention like ANAC (defined above) and server-initiated connections (defined below) may also ensure the client application owner can reduce the number of SDKs integrated within their mobile application and ensure third-party services can provide customized operational value to the users of the resultant client application.

Server Initiated Connections

Browsers do not support server-initiated connections, but mobile applications do but only if the user allows push services and web service has access to the push token. Push tokens are designed to protect such server-initiated access and—thus—should not be shared by the mobile application owner.

However, there are legitimate reasons for third-party web services to initiate a connection to the mobile app running on a user's client device; these include updating security data and business rules such as usage metrics.

The invention enables a multi-party interchange ecosystem where server-initiated connections can be facilities and managed through the client application owner without requiring they divulge tokens used to safeguard and control the process.

Controlled Access to Rich Data

A browser's access to client data is limited and unmanaged, causing risky behavior in an effort to access more data, uncertainty on the data being collected and almost no control by the user regarding their data.

The mobile ecosystem recognized the value data has in personalizing the user experience and has added permissions to safeguard access to client data and empowered the user to control said access.

The invention enables a multi-party interchange ecosystem where third-parties can register their requests for accessing client data while being respectful of the control the user and mobile app owner place on client data.

Privacy

The ad hoc and chaotic results of multiple parties downloading code, poorly defined SDK inclusion, and the use of an in-app browser to bypass application safeguards are being closely scrutinized under recent privacy and security regulations designed to protect the user. Many of these regulations include large penalties which implicate the app owner and demand they understand how data and security are being facilitated in the client application for which they are legally responsible.

The invention enables a multi-party interchange ecosystem where privacy regulations and data owner business rules that affect access and collection of data are centralized and used to manage data flow between the multiple parties.

Example Using Payment as a Multi-Party Interchange

Many examples demonstrate the confusion and inefficiencies of the historic browser model and how the market continues to struggle with client-based applications. Some examples include, but are not limited to, usage metrics, the increased data demand for all learning models of data analytics, privacy, payment, security, and virtual assistance.

Payment represents a widely adopted trend in which multiple parties must cooperate in exchanging data and facilitating functionality for the consumer to enjoy safe, easy payments. When a merchant creates a client application, it is designed so that a user can buy the merchant's goods and services. Payment is often done via the user's credit or debit payment card which is operated by a payment network and issued by a bank. There are many payment networks and possibly hundreds of issuing banks from which a user can get a payment card. These payment networks and banks must access user and device data to support regulations like anti-money laundering and ensure the payment is being done by the legitimate user. Not all banks use the same set of data and many banks and risk-scoring engines use data downloaded to the device to tag the device's identity.

There exists no well-managed, secure method for enabling multiple parties to instruct client applications on the selection of data to collect from the client, how to collect data from the user, how to provision data to the client device, how to remotely update security elements such as payment tokens stored in client memory, and how to ensure the integrity of the client and the application performing these functions.

Likewise, there exists no well-managed, secure method which allows application owners to manage, monitor and control how their client application interacts with multiple parties after the app has been deployed and installed on a user's client device.

BRIEF DESCRIPTION OF THE FIGURES

FIG. 1 illustrates a High-Level Architecture and Communication for an SDK Manager including systems for Network, SDK Manager, App Owner, $3^{rd}$ Party Service, Client, Client App+SDKs, App Data Permissions, Client Data, and User according to an embodiment of the present disclosure;

FIG. 2 illustrates SDK Owner Registration to an SDK Manager and Enrollment of Data including systems for Network, SDK Manager, SDK Owner, SDK, Tenant Profiles, and Executable Services according to an embodiment of the present disclosure;

FIG. 3 illustrates Application Registration to an SDK Manager and Enrollment of Data including systems for Network, SDK Manager, App Owner, Client Application, possibly multiple SDKs, SDKs Included, Client App+SDKs, App Distribution Services, multiple Clients, Tenant Profiles, Executable Services, Executable ANAC Data, Read Data Available, and Privacy Overrides according to an embodiment of the present disclosure;

FIG. 4 illustrates Registration and Enrollment of Data for Third-Parties who will Interchange with Client Applications including systems for Network, SDK Manager, App Owner, 3$^{rd}$ Party Service, Tenant Profiles, Executable Services, Read Data Available, 3$^{rd}$ Party Reads, Privacy Overrides, and Proxy Write Data according to an embodiment of the present disclosure;

FIG. 5 illustrates Application Network Access Control, or ANAC, Risk Quantification of Network Communication, Client System and Client Application including systems for Network, App Owner, 3$^{rd}$ Party Service, Client, Client App+SDKs, App Data Permissions, Client Data, SDK Manager, Tenant Profiles, Executable ANAC Data, Privacy Overrides, and Data from Client according to an embodiment of the present disclosure;

FIG. 6 illustrates Third-Party initiation of a connection to the application running on the user's client device including systems for Network, App Owner, 3$^{rd}$ Party Service, Client, Client App+SDKs, App Data Permissions, Client Data, User, SDK Manager, Tenant Profiles, and Executable Services according to an embodiment of the present disclosure;

FIG. 7 illustrates Third-Party Reading of Data with Privacy Considerations including systems for Network, App Owner, 3$^{rd}$ Party Service, Client, Client App+SDKs, App Data Permissions, Client Data, User, SDK Manager, Tenant Profiles, Executable Services, Read Data Available, 3$^{rd}$ Party Reads, and Privacy Overrides according to an embodiment of the present disclosure; and FIG. 8 illustrates Third-Party Provisioning of Data Written to the Client including systems for Network, 3$^{rd}$ Party Service, JavaScript Write, Secure Write, Client, Client App+SDKs, App Data Permissions, Client Data, SDK Manager, Tenant Profiles, Executable Services, and 3$^{rd}$ Party Data to Write according to an embodiment of the present disclosure.

FIG. 9 illustrates Overview of SDK Manager Data Collection including systems for SDK Manager, Tenant Profiles, Executable Services, Proxy Write Data, Privacy Overrides, 3$^{rd}$ Party Reads, Data from Client, Read Data Available, Executable ANAC Data, Client, App Owner, 3$^{rd}$ Party Service, SDK Owner, Privacy Regulations, OS Data Permissions, and Client App+SDKs according to an embodiment of the present disclosure.

FIG. 10 illustrates Overview of the Hierarchy of SDK Managers including systems for SDK Manager Directory and multiple instances of: SDK Managers, SDK Owners, App Owners, 3$^{rd}$ Party Services, and Clients according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Referring to the invention in more detail, in FIG. 1 there is shown a Network 5, such as the Internet; items connected across Network 5 can communicate reliably via Network 5. Connected to Network 5 is a Client 10, such as a PC or smartphone, an App Owner 35, a 3$^{rd}$ Party Service 40, and an SDK Manager 55.

App Owner 35 is responsible for Client App+SDKs 50, such as a merchant or banking service is responsible for their mobile application. The App Owner may not directly code Client App+SDKs 50, but the brand of Client App+SDKs 50 and resources such as data and connectivity tokens are controlled by App Owner 35.

A 3$^{rd}$ Party Service 40 provides additional services, such as payment or data analytics, to either App Owner 35, other third-parties, the user, or possibly a combination of these recipients.

Client App+SDKs 50 interacts with Client Data 25 through App Data Permissions 20 which determine which Client Data 25 can be accessed. App Data Permissions 20 may also allow User 30 of Client 10 to approve or deny the requested data permissions of Client App+SDKs 50.

Client Data 25 can contain a wide-range of data, including, but not limited to, User 10 added data (e.g. pictures, music, created works), application data (e.g. preferences, identifications . . . any data written by an application), system logging data (e.g. communications such as text and calls, location history, remembered networks connections (e.g. wireless LANs, paired Bluetooth devices), and system data (e.g. versions, application lists, hardware capabilities).

FIG. 1 shows four primary components—namely Client 10, App Owner 35, 3$^{rd}$ Party Service 40 and SDK Manager 55—can communicate to facilitate interchanges between the multiple parties, User 10, and Client Data 25 residing on the Client 10.

Referring to the invention in more detail, in FIG. 2 there is shown a Network 5, such as the Internet; all items connected to Network 5 can communicate and exchange data reliably via Network 5. Connected to Network 5 is an SDK Owner 60, an SDK 65 and an SDK Manager 55.

The SDK Owner 60 registers SDK 65 with SDK Manager 55 such that certain data regarding the SDK Owner 60 and SDK 65 are catalogued by the SDK Manager 55 for use by other parties. An SDK Owner 60 may register multiple SDKs 65.

Data catalogued during an SDK 65 registration can include: (1) Tenant Profiles 95 which records information regarding the SDK Owner 60 and SDK 65, and (2) Executable Services 90 which details methods supported by SDK 65 and available for callable execution by third-parties. The methods in Executable Services 90 can provide primitives such as reading data from a client, writing data to client memory, challenging the user to input data into the client, establishing a third-party initiated connection to the SDK 65 running as part of an application on the client, and other functionality.

Referring to the invention in more detail, in FIG. 3 there is shown a Network 5, such as the Internet; all items connected to Network 5 can communicate and exchange data reliably via Network 5. Connected to Network 5 is an SDK Manager 55, an App Owner 35, multiple App Distribution Services 70, and multiple instances of Client 10.

App Owner 35 combines the Client Application 15 for which App Owner 35 is responsible with any number of SDKs 65 provided by third-parties to form the Client App+SDKs 50. The various instances of different SDK 65 used is captured in an SDK List 75.

App Owner 35 sends Client App+SDKs 50 and SDK List 75 as part of the registration process with SDK Manager 55 so that certain data is catalogued by SDK Manager 55 for use by other parties. An App Owner 35 may register multiple Client App+SDKs 50 each with their own SDK List 75.

Data catalogued during a Client App+SDKs 50 registration can include: (1) Tenant Profiles 95 which records information regarding the App Owner 55, the Client App+SDKs 50, and its related SDK List 75; (2) Executable ANAC Data 100 which records run-time image, OS, installation, load and other information regarding Client App+SDKs 50 which will be used to establish the integrity of Client App+SDKs 50 when it is installed on Client 10; (3) Executable Services 90 which details methods supported by Client App+SDKs 50 and possibly by SDKs contained in the SDK List 75, these methods are available to third-parties; (4) Read Data Available 105 which details what client data is available through data permissions requested by Client App+SDKs 50 and possibly by SDKs contained in the SDK List 75; and (5) Privacy Overrides 110 which can allow App Owner 35 to denote which data elements in Read Data Available 105 should not be made available to third parties.

The methods in Executable Services 90 can provide primitives such as reading data from a client, writing data to client memory, challenging the user to input data into the client, establishing a third-party initiated connection to the Client App+SDKs 50 running on the client, and other functionality.

As part of Client App+SDKs 50 registration, App Owner 35 sends Client App+SDKs 50 to any number of Distribution Services 70 so that Client App+SDKs 50 can be downloaded to any number of Clients 10. Examples of Distribution Services 70 include Apple's App Store and Google's Play Store.

Referring to the invention in more detail, in FIG. 4 there is shown a Network 5, such as the Internet; all items connected to Network 5 can communicate and exchange data reliably via Network 5. Connected to Network 5 is a $3^{rd}$ Party Service 40, an App Owner 35, and an SDK Manager 55.

$3^{rd}$ Party Service 40 is registered with SDK Manager 55 so that certain data can be catalogued by SDK Manager 55 for use by other parties.

Data catalogued during a $3^{rd}$ Party Service 40 registration include: Tenant Profiles 95 which records information regarding $3^{rd}$ Party Service 40 including the service primitives $3^{rd}$ Party Service 40 intends to utilize.

Executable Services 90 details the primitive services available for a particular client application including any SDKs integrated as part of the application. $3^{rd}$ Party Service 40 can request registration for use of methods in Executable Services 90 which can provide primitives such as reading data from a client, writing data to client memory, challenging the user to input data into the client, establishing a third-party initiated connection to software running on the client, and other functionality.

Read Data Available 105 and Privacy Overrides 110 collectively detail the data available for reading by $3^{rd}$ Party Service 40. $3^{rd}$ Party Service can indicate which data it would like to read from this collective set and catalogue the subset in $3^{rd}$ Party Reads 125.

$3^{rd}$ Party Service 40 can also indicate if data will be written to the client using the SDK Manager 55 as a proxy for writing to client memory. Proxy Write Data 130 details the format of data written by proxy and stores proxy write data for $3^{rd}$ Party Service.

SDK Manager 55 notifies App Owner 35 of all the registration details regarding 3rd Party Service 40. App Owner 35 can have the ability to deny any or all registration requests of $3^{rd}$ Party Service 40. When App Owner 35 denies a registration request, that particular functionality will not be available for $3^{rd}$ Party Service 40 to use.

Referring to the invention in more detail, in FIG. 5 there is shown a Network 5, such as the Internet; all items connected to the Network 5 can communicate and exchange data reliably via Network 5. Connected to Network 5 is an SDK Manager 55, an App Owner 35, a $3^{rd}$ Party Service 40, and a Client 10.

Operating on Client 10 is Client App+SDKs 50 which accesses Client Data 25 on Client 10 via App Data Permissions 20. Client Data 25 can yield information about the Client 10, the operating system functioning on Client 10, the installation of Client App+SDKs 50 on Client 10, and other integrity-related data such as indications of bots or emulators running on Client 10.

Client App+SDKs 50 can also compute integrity-related data about itself including interactions between Client App+SDKs 50 and Client 10, code checksums of Client App+SDKs 50, and other data.

These computations are performed as part of Client App+SDKs 50 but the actual code executing can be SDKs and not necessarily code the App Owner 35 was responsible for creating.

Using data from Tenant Profiles 95, SDK Manager 55 can consult data from Privacy Overrides 110 to prohibit certain data from being collected from Client Data 25 and—thus—not transmit certain data off Client 10.

Client App+SDKs 50—or an SDK integrated within Client App+SDKs 50—can communicate system, app, environment, and other integrity-related data to SDK Manager 55.

Using data from Tenant Profiles 95, SDK Manager 55 can also collect network integrity-related data that may indicate a risk in how Client 10 was connected to Network 5. SDK Manager 55 can consult data from Privacy Overrides 110 to prohibit certain Network 5 data from being collected.

The resultant, privacy-compliant Client Data 25 and Network 5 data collected can be stored in Data from Client 115 for processing.

Using data from Tenant Profiles 95, SDK Manager 55 can compare the Network 5 integrity-related data and integrity-related data from Client 10 with integrity-related data it created as described in FIG. 3 App Registration and stored in Executable ANAC Data 100. This comparison can be scored to determine (1) any risk associated with allowing Client 10 to connect to web services of App Owner 35 and any $3^{rd}$ Party Services 40, and (2) any risk associated with data collected from Client Data 25 and Network 5.

This process, Application Network Access Control, or ANAC, safeguards web services from a compromised Client 10 maliciously connecting to them and scores the integrity of data collected from Client Data 25 and Network 5. The overall risk of Client 10, Client Data 25, and data regarding how Client 10 connects to Network 5 can be summarized in an ANAC risk score which can be provided by SDK Manager 55 to App Owner 35 and any $3^{rd}$ Party Service 40 any time a Client 10 connect to these web services. ANAC scoring can be done with each connection by Client 10 and even multiple times within a connection.

Referring to the invention in more detail, in FIG. 6 there is shown a Network 5, such as the Internet; all items connected to the Network 5 can communicate and exchange data reliably via Network 5. Connected to Network 5 is an SDK Manager 55, an App Owner 35, a $3^{rd}$ Party Service 40, and a Client 10.

$3^{rd}$ Party Service 40 can request from SDK Manager 55 a server-initiated connection to Client App+SDKs 50 installed on Client 10, indicated the purpose(s) and actions of the server-initiated connection.

Using Tenant Profiles 95 and Executable Services 100, SDK Manager 55 can validate server-initiated connections for the requested purpose(s) are supported by Client App+SDKs 50, enabled by App Owner 35, and $3^{rd}$ Party Service 40 is approved to initiate a server connection with Client App+SDKs 50 for the requested purpose(s) and actions.

SDK Manager 55 can then request App Owner 35 initiate a server connection to Client App+SDKs 50 using available push services such as those offered by Apple and Android. App Owner 35 can provide Client App+SDKs 50 with the address to connect to 3$^{rd}$ Party Service 40.

Once Client App+SDKs 50 has initiated a connection with 3$^{rd}$ Party Service 40, 3$^{rd}$ Party Service 40 may execute the primitives for which it was authorized according to data the 3$^{rd}$ Party Service 40 learned as part of the functionality of FIG. 4 3$^{rd}$ Party Registration.

Server-initiated communication with Client App+SDKs 50 running on a Client 10 can be used to perform many actions including updating data written to Client 10 in Client Data 25 and prompting the User 30 to enter data into Client App+SDKs 50 as part of a security challenge, confirmation or other action.

Referring to the invention in more detail, in FIG. 7 there is shown a Network 5, such as the Internet; all items connected to the Network 5 can communicate and exchange data reliably via Network 5. Connected to Network 5 is an SDK Manager 55, an App Owner 35, a 3$^{rd}$ Party Service 40, and a Client 10.

3$^{rd}$ Party Service 40 can make a request to read Client Data 25 on Client 10 in two manners: (1) App Owner 35 can read Client Data 25 and provide the it to 3$^{rd}$ Party Service 40, or (2) 3$^{rd}$ Party Service 40 can connect directly to Client App+SDKs 50 and instruct it to read Client Data 25. Both manners use Client App+SDKS 50 to read Client Data 25 from Client 10 according to App Data Permissions 20.

When App Owner 35 reads Client Data 25 on behalf of 3$^{rd}$ Party Service 40, App Owner 35 can process the Client Data 25 read from Client 10 before the data is sent to 3$^{rd}$ Party Service 40. This can benefit the multi-party interchange because App Owner 35 may cache certain useful data for User 30 in the App Owner 35 online environment (i.e. not on Client 10) and have business reasons for editing, augmenting or deleting the Client Data 25 read from Client 10. The resultant data sent to 3$^{rd}$ Party Service 40 by App Owner 35 may be more beneficial and better managed than just the Client Data 25 as read from Client 10.

When 3$^{rd}$ Party Service 40 uses Client App+SDKs 50 to read Client Data 25 directly from Client 10, it may benefit from performance or other business considerations.

SDK Manager 55 facilitates the reading of data by 3$^{rd}$ Party Service 40 using Tenant Profiles 95, Executable Services 90, Read Data Available 105, 3$^{rd}$ Party Reads 125, and Privacy Overrides 110. SDK Manager can ensure and enforce alignment between 3$^{rd}$ Party Service 40, App Owner 35 and the data read. This can include controlling which Client Data 25 is available to read according to the business considerations of App Owner 35 and privacy considerations of App Owner 35 and Privacy Overrides 110. The privacy considerations for User 30 are facilitated by App Data Permissions 20.

Referring to the invention in more detail, in FIG. 8 there is shown a Network 5, such as the Internet; all items connected to the Network 5 can communicate and exchange data reliably via Network 5. Connected to Network 5 is an SDK Manager 55, an App Owner 35, a 3$^{rd}$ Party Service 40, and a Client 10.

3$^{rd}$ Party Service 40 can make a request to write data into Client Data 25 on Client 10 in two manners: (1) 3$^{rd}$ Party Service 40 can connect directly to Client App+SDKs 50 and instruct it to write data 3$^{rd}$ Party Service 40 provides into Client Data 25, or (2) 3$^{rd}$ Party Service 40 can provide data to be written to Client 10 to the SDK Manager 55 who will write the data provided into Client Data 25. Both manners use Client App+SDKS 50 to write Client Data 25 on Client 10 according to App Data Permissions 20.

When 3$^{rd}$ Party Service 40 uses Client App+SDKs 50 to write Client Data 25 directly from Client 10, it can use Secure Write 155 to ensure the data is only provided to Client 10. 3$^{rd}$ Party Service 40 can understand which Secure Write 155 methods are supported by Client App+SDKs 50 from data 3$^{rd}$ Party Service 40 learned when it performed functions in FIG. 4. 3$^{rd}$ Party Registration. Secure Write 155 may improve security and satisfy privacy and other business considerations by using encryption, mutual authentication and other capabilities.

When SDK Manager 55 writes to Client Data 25 on behalf of 3$^{rd}$ Party Service 40, SDK Manager 55 serves as a trusted third-party proxy for Client 10 who keeps the data confidential and unknown to others including the owner of the Client App+SDKs 50. Writing data using SDK Manager 55 as a proxy for Client 10 can benefit a 3$^{rd}$ Party Service 40 when it wishes to continue with legacy write methods such as JavaScript Write 150. 3$^{rd}$ Party Service 40 may already have JavaScript methods in place for writing data to a browser. SDK Manager 55 acting as a write proxy to Client 10 enables writing data to Client Data 25 on Client 10 possibly without requiring changes by 3$^{rd}$ Party Service 40.

SDK Manager 55 facilitates the writing of data by Party Service 40 using Tenant Profiles 95, Executable Services 90, Read Data Available 105, and 3$^{rd}$ Party Data to Write 130.

Referring to the invention in more detail, in FIG. 9 there is shown an overview of SDK Manager 55 and its connections to various databases SDK Manager 55 maintains.

Tenant Profiles 95 contains all the data related to various tenants who connect with SDK Manager 55. Data from various instances of Client 10 can include which Client App+SDKs 50 are installed on Client 10 and details about the Client 10 operational environment such as device make and model, operating system, versions, etc. Data from various instances of App Owner 35 can contain which Client App+SDKs 50 they are responsible for and various operational considerations such as connections and billing. Data from various instances of 3$^{rd}$ Party Service 40 can contain to which Client App+SDKs 50 they can be connected and various operational considerations such as connections and billing. Data from various instances of SDK Owner 60 can contain which SDKs are their responsibility, which Client App+SDKs 50 incorporate their SDK, and various operational considerations such as connections and billing.

Data from Client 115 stores data collected from Client 10 during actions such as described in FIG. 5 App Network Access Control (ANAC). The aggregation of such data across (1) a wide collection of instances of Client 10, (2) a wide range of Client App+SDKs which may have diverse permissions to access a broader set of data, and (3) an increased frequency of data collections because of the multiple parties provide data valuable to learning systems for various security and risk schemas. Such a rich collection of data enables a consortium of data collection for the multi-party interchange ecosystem.

3$^{rd}$ Party Reads 125 stores which data a 3$^{rd}$ Party Service 40 wishes to read from Client 10. The data presented to be available for reading by 3$^{rd}$ Party Service 40 is affected by (1) Read Data Available 105 which is the overall possible data a Client App+SDKs 50 can access according to its requested read permissions and how those permissions relate to available data on Client 10 according to OS Data Permissions 165 and (2) Privacy Overrides 110. 3$^{rd}$ Party Service 40 may only be able to choose data to read that is the intersection of the overall possible data and data not privacy controlled.

Executable Services 90 contains service primitives an App Owner 35 and/or an SDK Owner 60 make available to 3$^{rd}$ Party Services 40 and which primitives a 3$^{rd}$ Party Service 40 is authorized to use within a Client App+SDKs 50. Primitives can include reading data from a client, writing data to client memory, challenging the user to input data into the client, establishing a third-party initiated connection to software running on the client, and other functionality.

Proxy Write Data 130 stores data in transit between a 3$^{rd}$ Party Service 40, the SDK Manager 55, and the Client 10. Periodically when a Client App+SDKs 50 is launched or operational on a Client 10, the Client App+SDKs 50 can connect to the SDK Manager 55 to enable the opportunity for SDK Manager 55 to write Proxy Write Data 130 into the memory of Client 10. Business rules between 3$^{rd}$ Party Service 40 and SDK Manager 55 would determine if the data in Proxy Write Data 130 continues to be stored in Proxy Write Data 130 after it is written to Client 10 (possibly as a form of back-up or initialization of a new Client 10 device) or if the data written is deleted from Proxy Write Data 130.

Privacy Overrides 110 stores which data elements an App Owner 35 wishes to exclude from 3$^{rd}$ Party Services 40. Privacy Overrides 110 also can contain privacy related regulations maintained in the Privacy Regulations 160 database which reflect certain data that may be protected according to region, citizenship and other factors. Privacy Overrides 110 creates a subset of Read Data Available 105; this subset is sent to Client App+SDKs 50 for storage on Client 10.

Executable ANAC Data 100 stores the run-time image, OS, installation, load and other information regarding Client App+SDKs 50 which can be used to establish the validity and integrity of Client App+SDKs 50 when it is installed on Client 10.

Read Data Available 105 which stores the overall possible data a Client App+SDKs 50 can access according to its requested read permissions and how those permissions relate to available data on Client 10 according to OS Data Permissions 165.

Referring to the invention in more detail, in FIG. 10 there is shown a Network 5, such as the Internet; all items connected to the Network 5 can communicate and exchange data reliably via Network 5. Connected to Network 5 is an SDK Manager Directory 170 and various instances of SDK Manager 55.

SDK Manager Directory 170 catalogues in which instance or instances of SDK Manger 55 various instances of SDK Owner 60, App Owner 35, 3$^{rd}$ Party Service 40, and Client 10 are stored. By using a directory of this data, any of the multi-parties wishing to interchange with other parties may locate the other party or its reliant data such as SDKs and client applications.

SDK Manager Directory 170 allows a 3$^{rd}$ Party Service 40 wishing to connect to a client application to locate the client application and its owner so that the 3$^{rd}$ Party Service 40 can register to perform interchange actions.

SDK Manger Directory 170 also allows SDK Owner 60 and App Owner 35 to publish their supported capabilities so that various instances of 3$^{rd}$ Party Service 40 can know which SDKs and client applications perform functionality the 3$^{rd}$ Party Service 40 would like performed.

SDK Manager Directory 170 also provides a global catalogue of connected instances of Client 10 including what SDK and client app capabilities are installed on a particular Client 10.

Alternative Ways for the Invention

In broad embodiment, the present invention can be expanded and implemented in different manners, including but not limited to:

Network 5 can be the Internet, offered as wired or wireless, as a LAN, WAN, or VPN, or it could be a personal area network or private wired or wireless network connecting multiple instances of Client 10.

Client 10 can be a PC or smartphone; other examples include, but are not limited to, gaming consoles (e.g. (PlayStation, Xbox), home hubs (e.g. Alexa, iHome), smart cars (e.g. Acura, Ford), wearables (e.g. watches, rings), network servers, and devices comprising the Internet of Things (e.g. sensors, doorbells, cameras . . . )

Client Data 25 can be anonymized to protect a use's privacy by an SDK 65 before the Client Data 25 is sent from the Client 10.

Browser functionality is expected to follow benefits of a Client App+SDKs 50 including managed and enhanced read, write, user challenge, and server notification capabilities. As browsers achieve these capabilities various drawings which show a Client App+SDKs 50 could also show a browser for connecting Client 10 a Network 5.

Primitives for reading, writing, user challenge, and server initiated connections can be done by a Client Application 15; inclusion of various instances—or any—SDKs 65 may not be necessary.

While Privacy Overrides 110 and Privacy Regulations 160 enhance data management and improve the user experience, they are optional.

What is claimed is:

1. A system for storing data and communicating with multiple enrolled parties to facilitate interchanges between the enrolled parties and a software application that is operating on a client computer, with an SDK manager, an app owner, a third party service, and a client being connected to a network, comprising:
   a non-transitory memory and one or more hardware processors coupled with the non-transitory memory and configured to read instructions from the non-transitory memory to cause the system to perform operations comprising:
   registering a software development kit (SDK) with an SDK Manager such that data regarding an SDK Owner and the SDK are catalogued by the SDK Manager for use by other parties;
   combining a client application for which an app owner is responsible with at least one SDK provided by a third-party to form a Client App+SDK;
   sending a Client App+SDK and an SDK List as part of a registration process with an SDK Manager, wherein data is catalogued by the SDK Manager for use by other parties;
   sending at least one Client App+SDK to any number of Distribution Services, to make the at least one Client App+SDK downloadable to one or more clients;
   notifying an app owner of registration data regarding at least one Third Party Service; and
   allowing the app owner to deny registration requests of the at least one Third Party Service, wherein when the app owner denies a registration request, a functionality will not be permitted for a requesting third party service to use.

2. The method of claim 1, wherein the method further includes the step of operating at least one Client App+SDK on a client to access client data on a client via App Data Permissions.

3. The method of claim 1, wherein the method further includes the step of at least one Client App+SDK computing integrity-related data about itself.

4. The method of claim 3, wherein the step of at least one Client App+SDK computing integrity-related data about itself comprises at least one of including interactions between Client App+SDKs and Client, and code checksums of Client App+SDKs.

5. A system for storing data and communicating with multiple enrolled parties to facilitate interchanges between the enrolled parties and a software application that is operating on a client computer, with an SDK manager, an app owner, a third party service, and a client being connected to a network, comprising:
- a non-transitory memory and one or more hardware processors coupled with the non-transitory memory and configured to read instructions from the non-transitory memory to cause the system to perform operations comprising:
  - registering a software development kit (SDK) with an SDK Manager such that data regarding an SDK Owner and the SDK are catalogued by the SDK Manager for use by other parties;
  - combining a client application for which an app owner is responsible with at least one SDK provided by a third-party to form a Client App+SDK;
  - sending a Client App+SDK and an SDK List as part of a registration process with an SDK Manager, wherein data is catalogued by the SDK Manager for use by other parties;
  - sending at least one Client App+SDK to any number of Distribution Services, to make the at least one Client App+SDK downloadable to one or more clients;
  - notifying an app owner 35 of registration data regarding at least one Third Party Service;
  - allowing the app owner to deny registration requests of the at least one Third Party Service;
  - wherein the method further includes the step of operating at least one Client App+SDK on a client to access client data on a client via App Data Permissions, including at least one of interactions between Client App+SDKs and Client, and code checksums of Client App+SDKs.

* * * * *